US009894126B1

(12) United States Patent
Block et al.

(10) Patent No.: US 9,894,126 B1
(45) Date of Patent: Feb. 13, 2018

(54) SYSTEMS AND METHODS OF SMOOTHLY TRANSITIONING BETWEEN COMPRESSED VIDEO STREAMS

(71) Applicant: INFOCUS CORPORATION, Portland, OR (US)

(72) Inventors: Frederick P Block, Westminster, CO (US); Eric Wogsberg, Oakland, CA (US)

(73) Assignee: INFOCUS CORPORATION, Portland, OR (US)

( * ) Notice: Subject to any disclaimer, the term of this patent is extended or adjusted under 35 U.S.C. 154(b) by 102 days.

(21) Appl. No.: 14/724,562

(22) Filed: May 28, 2015

(51) Int. Cl.
*H04L 12/58* (2006.01)
*H04L 29/06* (2006.01)
*H04N 19/136* (2014.01)
*H04N 19/172* (2014.01)

(52) U.S. Cl.
CPC ........ *H04L 65/604* (2013.01); *H04L 65/4069* (2013.01); *H04L 65/607* (2013.01); *H04N 19/136* (2014.11); *H04N 19/172* (2014.11)

(58) Field of Classification Search
USPC ................................................. 709/219, 231
See application file for complete search history.

(56) References Cited

U.S. PATENT DOCUMENTS

| 7,394,850 | B1 * | 7/2008 | Gordon | ............ | H04N 21/23424 |
| | | | | | 375/240.01 |
| 9,380,272 | B2 * | 6/2016 | Wollmershauser | .... | H04N 7/181 |
| 2002/0130976 | A1 | 9/2002 | Gutta et al. | | |
| 2002/0170067 | A1 | 11/2002 | Norstrom et al. | | |
| 2005/0022245 | A1 * | 1/2005 | Nallur | ................ | H04N 21/8455 |
| | | | | | 725/88 |
| 2007/0024706 | A1 * | 2/2007 | Brannon, Jr. | ...... | H04N 7/17318 |
| | | | | | 348/142 |
| 2007/0250890 | A1 | 10/2007 | Joshi et al. | | |
| 2008/0158337 | A1 * | 7/2008 | Richardson | ........... | H04L 12/185 |
| | | | | | 348/14.09 |
| 2009/0044242 | A1 * | 2/2009 | Ramakrishnan | ....... | H04N 7/162 |
| | | | | | 725/118 |
| 2012/0016965 | A1 * | 1/2012 | Chen | ................. | H04N 21/23439 |
| | | | | | 709/219 |
| 2012/0150953 | A1 | 6/2012 | Costanzo et al. | | |
| 2012/0236111 | A1 * | 9/2012 | Halavy | .................. | H04N 7/152 |
| | | | | | 348/14.09 |
| 2012/0254915 | A1 | 10/2012 | Oztaskent | | |

(Continued)

*Primary Examiner* — Jude Jean Gilles
(74) *Attorney, Agent, or Firm* — McCoy Russell LLP (57) ABSTRACT

The technology disclosed relates to enabling smooth transitioning between compressed video streams. In particular, it relates to scheduling transitions between compressed video streams to be shown in an area of a display such that while decoding, decompressing and buffering a first video stream for display, commencing decoding, decompressing and buffering of a second video stream at a predetermined time before a scheduled showing of the second video stream. It further relates to switching buffers between display of the first and second video streams at the scheduled showing of the second video stream, which results in immediate display of the second video stream without delay. In one implementation, switching between the buffers for the first and second video streams includes modifying z-ordering of display layers corresponding to the first and second video streams.

18 Claims, 7 Drawing Sheets

(56) References Cited

U.S. PATENT DOCUMENTS

| | | | |
|---|---|---|---|
| 2013/0219442 A1 | 8/2013 | Hu et al. | |
| 2013/0308635 A1* | 11/2013 | Chen | H04N 21/2662 370/390 |
| 2013/0336627 A1 | 12/2013 | Calvert | |
| 2014/0137176 A1* | 5/2014 | Gaillard | H04N 21/23106 725/116 |
| 2014/0269776 A1* | 9/2014 | Bomfim | H04N 21/64322 370/503 |
| 2015/0019694 A1* | 1/2015 | Feng | H04L 65/601 709/219 |
| 2015/0281769 A1* | 10/2015 | Chiu | H04N 5/38 348/564 |
| 2016/0044342 A1* | 2/2016 | Imanishi | H04N 21/262 725/109 |

* cited by examiner

SYSTEMS AND METHODS OF SMOOTHLY TRANSITIONING BETWEEN COMPRESSED VIDEO STREAMS

FIELD OF THE TECHNOLOGY DISCLOSED

The technology disclosed generally relates to multicast streaming of video stream sources, and more particularly relates to eliminating switching delays between video streams in a multicast streaming environment.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Multicast streaming technologies pertain to transmission of multiple video/audio streams to individual clients. Each such stream can originate from a different video/audio source and can employ different network technologies, such as Internet, Ethernet, Frame Relay, fiber, etc. for transmission. A major drawback of such systems is latency, i.e., the required bandwidth is directly proportional to the number of video/audio sources streaming. Therefore, a high bandwidth is required for performing video/audio streaming of high quality.

The problem of latency is exacerbated in multicast streaming environments that require instantaneous switching between different compressed video/audio streams. Various solutions have been proposed to reduce the switching delay between compressed video/audio streams. However, these solutions have not been entirely successful because they either impose additional undesired computational requirements on the clients or are restricted to switching between streams originating from the same source. Accordingly, new technical solutions are needed to overcome the limitations in the prior art.

An opportunity arises to perform smooth transitioning between pluralities of compressed video/audio sources in a multicast streaming environment without requiring additional bandwidth or burdening the computational resources of the clients. Enhanced user experience and satisfaction may result.

SUMMARY

The technology disclosed relates to enabling smooth transitioning between compressed video streams. In particular, it relates to scheduling transitions between compressed video streams to be shown in an area of a display such that while decoding, decompressing and buffering a first video stream for display, commencing decoding, decompressing and buffering of a second video stream at a predetermined time before a scheduled showing of the second video stream. It further relates to switching buffers between display of the first and second video streams at the scheduled showing of the second video stream, which results in immediate display of the second video stream without delay.

In one implementation, switching between the buffers for the first and second video streams further includes modifying z-ordering of display layers corresponding to the first and second video streams, whereby a graphics card composes a display making visible the second video stream instead of the first video stream.

In another implementation, switching between the buffers for the first and second video streams further includes layer 2 switching of delivery of the first and second video streams to deliver the second video stream for display instead of the first video stream.

In yet another implementation, switching between the buffers for the first and second video streams further includes updating a video switching matrix to couple the second video stream instead of the first video stream to the display.

Another feature of the technology disclosed is to evaluate time separation between key frames in the second video stream and select the predetermined time based at least in part on the time separation.

In case of multiple pairs of first and second video streams, the technology disclosed includes sequencing scheduled transitions between the first and second video streams to reduce a number of video streams that are simultaneously in transition between the first and second video stream decoding.

Other aspects and advantages of the present invention can be seen on review of the drawings, the detailed description and the claims, which follow.

BRIEF DESCRIPTION OF THE DRAWINGS

In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which.

DESCRIPTION

The following detailed description is made with reference to the figures. Sample implementations are described to illustrate the technology disclosed, not to limit its scope, which is defined by the claims. Those of ordinary skill in the art will recognize a variety of equivalent variations on the description that follows.

Terminology

As used herein, a "second" or "subsequent" video stream refers to a given data, feed, signal, event or value that follows a predecessor "first" or "current" video stream, which can be data, feed, signal, event or value. In one implementation, a "second" or "subsequent" video stream is processed after a "first" or "current" video stream. In another implementation, a "second" or "subsequent" video stream is processed simultaneously with a "first" or "current" video stream. In yet another implementation, a "second" or "subsequent" video stream is processed pseudo-simultaneously or pseudo-parallelly with a "first" or "current" video stream such that processing of the "second" or "subsequent" video stream begins after a predetermined time delay relative to the initiation of the processing of the first" or "current" video stream, wherein the term "processing" includes displaying of a particular video stream. In a pseudo-simultaneous mode, a temporal overlap exists between at decoding, decompression, buffering or display of the "first" or "current" video stream and decoding, decompression, buffering or display of the "second" or "subsequent" video stream, wherein decoding, decompression, and buffering of the "second" or "subsequent" video stream is completed before a switch command to display the "second" or "subsequent" video stream is received.

As used herein, a given signal, event or value is "based on" a predecessor signal, event or value of the predecessor signal, event or value influenced by the given signal, event or value. If there is an intervening processing element, step or time period, the given signal, event or value can still be "based on" the predecessor signal, event or value. If the intervening processing element or step combines more than one signal, event or value, the signal output of the processing element or step is considered "based on" each of the signal, event or value inputs. If the given signal, event or value is the same as the predecessor signal, event or value, this is merely a degenerate case in which the given signal, event or value is still considered to be "based on" or "dependent on" the predecessor signal, event or value. "Responsiveness" of a given signal, event or value upon another signal, event or value is defined similarly.

Introduction

Existing multicast streaming solutions address the technical problem of switching delays in varieties of ways. For example, to minimize the interruption when using H.264 compressed video streams, the maximum interval at which I-frames is generated can be decreased. With such an approach, if an I-frame is generated at least once a second, the amount of time required to start showing a new video stream is slightly more than one second, with an average time of half a second. The issue with this approach is that frequently sending I-frames decreases the amount of compression of the video stream, which increases the amount of bandwidth needed to send it. In another example, some video stream sources support a request forcing transmission of a key frame. However, only few video stream sources support this kind of forced request.

The technology disclosed solves the technical problem of visible interruption seen on a video wall control system when switching between compressed video streams in a touring arrangement. Video wall control systems, such as Jupiter Systems' Canvas system, provide the ability to show the output from a sequence of inputs in the same video display window. This capability is called "touring". Historically, these kinds of systems often use direct and uncompressed video inputs, but are increasingly shifting to compressed inputs in video formats such as H.264 transmitted over a network. In a touring system, switching between directly connected uncompressed inputs typically takes only a few frames, on the order of 1/10th of a second—like changing the channel on a TV.

When using compressed inputs sent over a network, switching between inputs typically causes an interruption (up to several seconds) in the video stream resulting in a blank or frozen screen while the system starts decoding the new stream. The cause of this interruption is that the compression techniques used for video involve sending a full video frame (an "I-frame" or "key frame") only so often and then sending only "delta" information ("P-frames" or "B-frames"), which can be reconstituted into a full frame only using the most recently transmitted I-frame. When switching to a new stream, the display output therefore cannot proceed until an I-frame is received within the new stream, and even then it may take a few more frames for the decoder logic to be able to generate smooth video output. Displaying a blank or frozen screen can diminish the user experience significantly.

The technical solution proposed herein includes using an additional set of decoding logic and working storage to affect an instantaneous switch from one video stream to another in a multicast streaming environment. In particular, it includes applying processing-initiation time delays to pseudo-simultaneously or pseudo-parallelly or simultaneously or parallelly use a plurality of decoding logic and working storage units to process current and subsequent video streams directed at the same display, such that decoding of a subsequent video stream is initiated before the switch is scheduled to happen.

In one implementation, a touring schedule is set for a video wall control system such that instead of simply stopping processing of current stream $S_c$ and starting processing of subsequent video stream $S_s$ at time T, the technology disclosed starts background processing of subsequent video stream $S_s$ at an earlier time T–t and then at time T switches the display from current stream $S_c$ to subsequent video stream $S_s$.

Background processing of a subsequent video stream includes allocating stream-specific processing resources to the subsequent video stream that decode and decompress the subsequent video stream and store the processed subsequent video stream in a stream-specific buffer for immediate dispatch of the subsequent video stream during a switch. In one implementation, this is achieved by using graphics commands of a graphics processing unit (GPU) to define an order of window layers for the different video streams in the multicast streaming environment. This order, referred to as the "z-order", arranges a second window in which the subsequent video stream is displayed behind a first window displaying the current stream. Such an arrangement prepares the multicast streaming environment for an immediate switch without interrupting the display of the current stream.

After the subsequent video stream is processed and stored in its stream-specific buffer during the display of the current stream, a switch from the current stream to the subsequent video stream can be seamlessly executed with minimum or no switching delay. In one implementation, this is achieved by changing the z-order of the second window that causes it to be in front of the first window displaying the current stream. Furthermore, the technology disclosed deallocates any processing resources from the previous current stream and deletes the first window displaying the previous current stream.

Therefore, the technology disclosed is an improvement over current methods of switching between video streams in a touring arrangement because it—eliminates the visible interruption when the video streams are changed, works with all video stream sources and does not require frequent transmission of I-frames.

The technology disclosed can be advantageously used with installations such as network operation centers (NOC), public utility control centers, intelligent traffic management centers, process control, civil and military surveillance systems, call centers, financial management control rooms, boardrooms and video conference rooms.

The technology disclosed can be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

A detailed description of implementations of the technology disclosed is provided with reference to the FIGS. 1-7.

Multicast Streaming Environment

Figure 1:
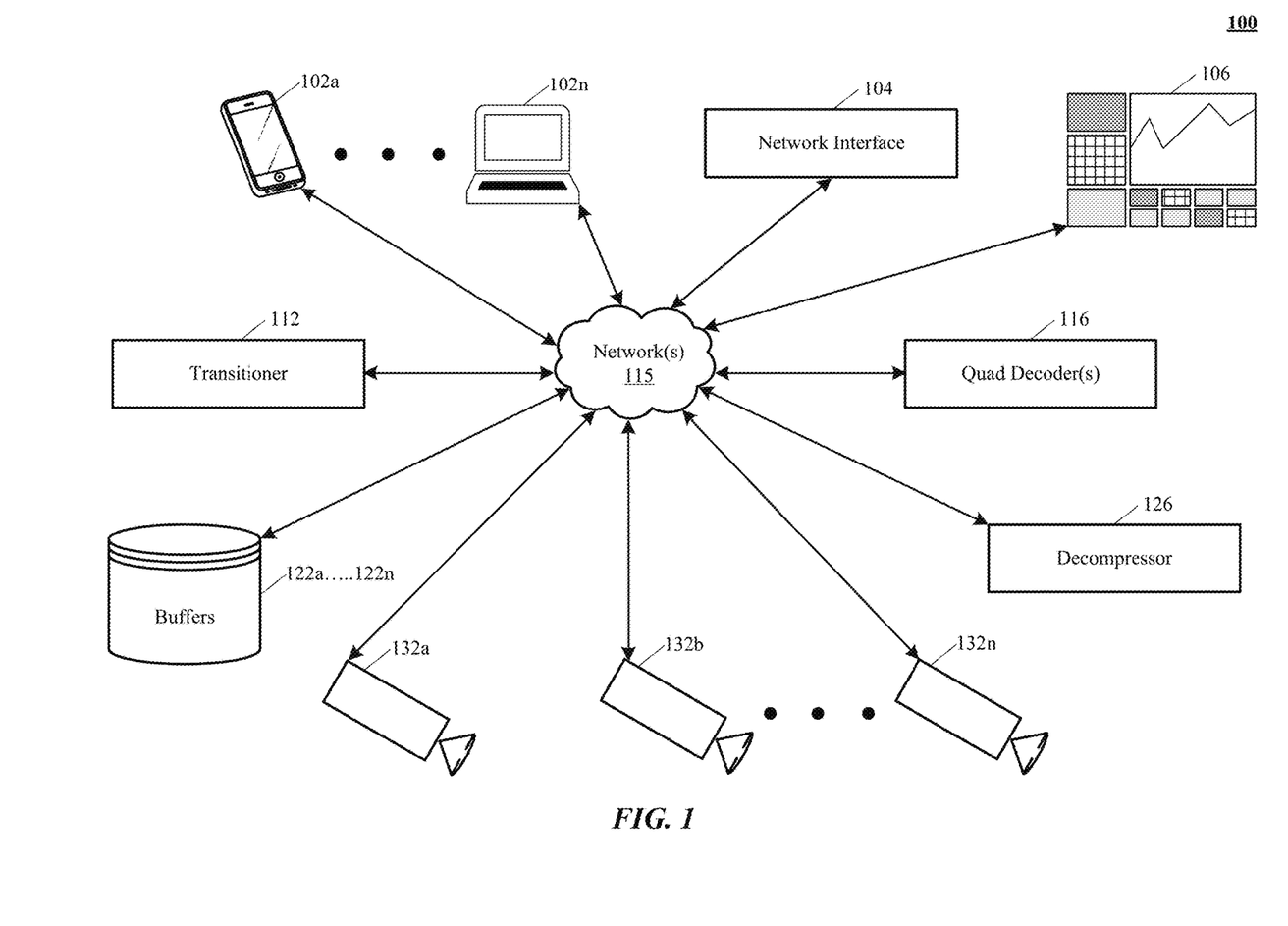
FIG. 1 illustrates an exemplary multicast streaming environment.

We describe a system and various implementations for smoothly transitioning between compressed video streams. The system and processes will be described with reference to FIG. 1 showing an architectural level schematic of a system in accordance with an implementation. Because FIG. 1 is an architectural diagram, certain details are intentionally omitted to improve the clarity of the description. The discussion of FIG. 1 will be organized as follows. First, the elements of the figure will be described, followed by their interconnections. Then, the use of the elements in the system will be described in greater detail.

FIG. 1 includes the multicast streamlining environment 100. The environment 100 includes user computing devices 102a-n, network interface 104 and display wall 106. FIG. 1 also shows transitioner 112, network(s) 115, quad decoder(s) 116, decompressor 126 and video stream sources 132a-n. Buffers 122a-n store among other things, processed streams from the different video stream sources 132a-n and are dedicated to individual video stream sources, such that, for example, buffer 122a is specified to video source 132a and buffer 122b is specified to video source 132b.

In other implementations, environment 100 may not have the same elements or components as those listed above and/or may have other/different elements or components instead of, or in addition to, those listed above, such as an on-demand database service, present module, or application platform. The different elements or components can be combined into single software modules and multiple software modules can run on the same hardware.

The interconnection of the elements of environment 100 will now be described. The network 115 couples the user computing devices 102a-n, the display wall 106, the network interface 104 and the video stream sources 132a-n in communication (indicated by double-headed arrows). The actual communication path can be point-to-point over public and/or private networks. Some items, such as AppWrapper (not shown), might be delivered indirectly, e.g. via an application store (not shown). All of the communications can occur over a variety of networks, e.g. private networks, VPN, MPLS circuit, or Internet, and can use appropriate APIs and data interchange formats, e.g. REST, JSON, XML, SOAP and/or JMS. All of the communications can be encrypted. This communication is generally over a network such as the LAN (local area network), WAN (wide area network), telephone network (Public Switched Telephone Network (PSTN), Session Initiation Protocol (SIP), wireless network, point-to-point network, star network, token ring network, hub network, Internet, inclusive of the mobile Internet, via protocols such as EDGE, 3G, 4G LTE, Wi-Fi and WiMAX. Additionally, a variety of authorization and authentication techniques, such as username/password, OAuth, Kerberos, SecureID, digital certificates, and more, can be used to secure the communications.

Network interface 104, transitioner 112, quad decoder(s) 116, decompressor 126 and buffers 122a-n can include one or more computers and computer systems coupled in communication with one another. They can also be one or more virtual computing and/or storage resources. For example, transitioner 112 can be one or more Amazon EC2 instances and buffers 122a-n can be Amazon S3 storage. Other computing-as-service platforms such as Force.com from Salesforce, Rackspace, or Heroku could be used rather than implementing the above-identified components on direct physical computers or traditional virtual machines. Additionally, the above-identified components can be implemented as engines. The engines can be of varying types including a graphics processing unit (GPU), workstation, server, computing cluster, blade server, server farm, or any other data processing system or computing device.

User computing devices 102a-n can be desktop personal computers, laptop computers, tablet computers, smartphones, personal digital assistants (PDA), digital image capture devices, cell phones, or any wireless access protocol (WAP) enabled devices or any other computing devices capable of interfacing directly or indirectly to the Internet or other network connection. User computing devices 102a-n can run an HTTP client, e.g., a browsing program, such as Microsoft's Internet Explorer browser, Mozilla's Firefox browser, Opera's browser, Google's Chrome, or a WAP-enabled browser in the case of a cell phone, PDA or other wireless device, or the like, allowing a participant of a video conference to access, process and view information, pages and applications available to it from environment 100 over network(s) 115.

User computing devices 102a-n also include one or more user interface devices, such as a keyboard, a mouse, trackball, touch pad, touch screen, pen or the like, for interacting with a video conference interface in conjunction with pages, forms, applications and other information provided by environment 100 or other systems or servers. For example, user computing devices 102a-n can be used to schedule transitions, conferences, perform selections, access data and applications hosted by environment 100, and to perform searches on stored data, and otherwise allow a video conference participant to interact with various video interface pages.

When operating in multicast streaming environment 100, cameras 132a-n can provide live video feed (i.e. both audio and image information) from different locations and/or users. In some implementations, cameras 132a-n can be any type of cameras, including cameras sensitive across the visible spectrum or, more typically, with enhanced sensitivity to a confined wavelength band (e.g., the infrared (IR) or ultraviolet bands); more generally, the term "camera" herein refers to any device (or combination of devices) capable of capturing an image of an object and representing that image in the form of digital data. For instance, cameras 132a-n can be surveillance cameras or private cameras mounted on a structure, such as a building or utility pole. In another example, cameras 132a-n can be embedded in user computing devices 102a-n described above or can be peripheral devices capable of streaming video during a video conference.

In some implementations, user computing devices 102a-n and cameras 132a-n can communicate with the different servers and processors (104, 112, 116, 126) using TCP/IP (Transfer Control Protocol and Internet Protocol) network and, at a higher network level, use other common Internet protocols to communicate, such as HTTP, FTP, AFS, WAP, etc.

In an example where HTTP is used, devices 102a-n and cameras 132a-n can include an HTTP client for sending and receiving HTTP messages to and from an HTTP server in environment 100. Such an HTTP server can be implemented as the sole network interface between the different servers and processors and network(s) 115, but other techniques can be used as well or instead. In some implementations, the interface between the different servers and processors and network(s) 115 includes load sharing functionality, such as round-robin HTTP request distributors to balance loads and distribute incoming HTTP requests evenly over a plurality of servers.

Environment 100 also implements a display wall 108 such as Jupiter Systems' *Fusion Catalyst*, controlled by a video switching matrix such as Jupiter Systems' *Fusion Catalyst*. Display wall 108 advances end-to-end conferencing between participants of a video conference such that remote participants can share streams from pluralities of video streams (cameras 132a-n) broadcasted on the display wall 108, both as sources and as destinations.

In one implementation, packet-switching technology can be used to show any information source on the display wall 108, such as a single window spanning multiple screens in the display wall 108 or as separate windows individually presented across different screens in the display wall 108. In one implementation, the video switching matrix supports client software applications as well as provides related data, code, forms, webpages and other information to and from user computing devices 102a-n and cameras 132a-n.

Quad decoder(s) 116 is configured to receive and decode a compressed video stream based on a codec associated with the video stream. As used herein, the term "codec" refers to the algorithm employed to encode (e.g. compress) or decode (e.g. decompress) video frames. In one implementation, quad decoder(s) 116 can be Jupiter Systems' *Quad HD Decoder Card* that features four independent decoders, each of which can handle video streams from a variety of formats and source types. In one implementation, quad decoder(s) 116 can supporting streams in MPEG-2, MPEG-4, H.264, and can decode and display streams from IP cameras, NVRs, desktop encoders and video management systems. In another implementation, it can support source resolutions range from NTSC and PAL to full high definition 1080p. Each decoder can have its own Gigabit Ethernet network connection to ensure sufficient bandwidth to each decoder to handle any stream bandwidth up to 20 Mbps with ease. Furthermore, each decoder can support all stream formats and protocols, adapting automatically to specific stream types.

Decompressor 126 generates a decompressed video stream from the decoded video stream. The decompressed video stream can be stored in a stream-specific buffer, provided to a rendering device for display, and the like, or any combination thereof.

Environment 100 also includes a plurality of stream-specific buffers 122a-n for temporarily storing each of the video streams from video stream sources 132a-n, respectively. The operation of the buffers can best be understood with reference to FIG. 2 which schematically illustrates buffers 122a, 122b, . . . , 122n and their associated video streams from video stream sources buffers 132a, 132b, . . . , 132n. In other implementations, stream-specific buffers 122a-n serve as memory structures, such as first-in first-out (FIFO) buffers, that receive and store video frames communicated via the video streams. In particular, stream-specific buffers 122a-n store pixel information, motion vector information and other information representing a set of video images for display. In one implementation, stream-specific buffers 122a-n can store both the compressed video frames received via the video stream and video frames that have been decoded by quad decoder(s) 116.

In multicast streaming environment 100, transitioner 112 provides the additional decoding, decompression and buffer resources for pseudo-simultaneous processing of a subsequent video stream while decoding, decompressing and buffering a current video stream. Transitioner 112 can utilize the most advanced graphics GPU architecture that includes output cards capable of driving multiple displays at up to 2560×1600 (Dual-Link DVI) digital, or up to 2048×1536 analog. In one implementation, transitioner 112 can have 11 GB/s of internal bandwidth and 256 MB of GDDR3 memory per card to render complex application data while displaying multiple video or computer inputs simultaneously. In other implementations, transitioner 112 can be a PC with Intel CPUs and Microsoft Windows, with two Quad Core Xeon CPUs and up to 64 GB RAM.

During operation, transitioner 112 causes immediate display of a subsequent video stream when transitioning between current and subsequent video streams by switching stream-specific buffers corresponding to the current and subsequent video streams at the scheduled showing of the subsequent video stream. In one implementation, transitioner 112 achieves this by modifying z-ordering of display layers corresponding to the current and subsequent video streams. In another implementation, transitioner 112 achieves this by performing layer 2 switching of delivery of the current and subsequent video streams to deliver the subsequent video stream for display instead of the current video stream. In yet another implementation, transitioner 112 achieves this by updating a video switching matrix to couple the subsequent video stream instead of the current video stream to the display.

Multicast Streaming Workflow

Figure 2:
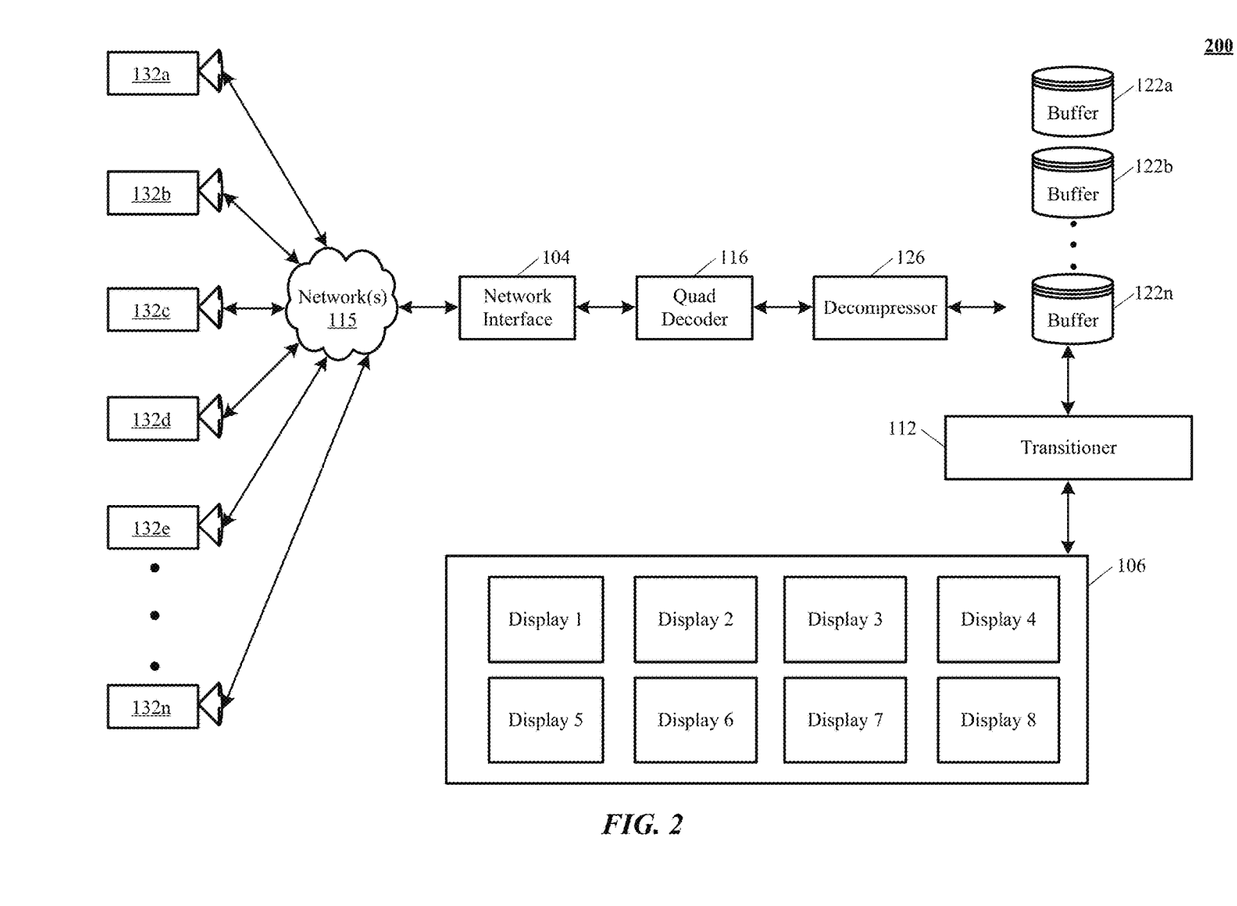
FIG. 2 illustrates a block diagram of an example workflow in which the technologies disclosed herein can be used.

FIG. 2 illustrates a block diagram of an example workflow 200 in which the technologies disclosed herein can be used. Pluralities of video streams 132a-n are transmitted via the network 115 to a network interface 104, which presents them to quad decoder(s) 116 and decompressor 126. After decoding and decompressing the compressed video streams, the uncompressed video frames are sent to respective stream-specific buffers 122a-n for further processing, including transmission of the different video streams 132a-n, via transitioner 112, across different displays (e.g. display 1-display 8) of the display wall 106. Display wall 106 incorporates all of the visual data sources found in a control room environment and displays them in movable, scalable windows on a virtual display comprised of multiple output devices: monitors, LCD flat panels, plasma panels, projection cubes or a rear projection system. Data sources can include local applications, remote network applications, remote network RGB streams, compressed network video streams, directly connected SD and HD video, VGA, and DVI inputs.

In other implementations, the different video streams 132a-n are transmitted to a display device such as a computer monitor, where they are each displayed in their own window on the display surface. In yet other implementations, the decompressed frames need not be displayed, but may be sent for further processing such as in a security system wherein the processing would consist of performing facial recognition for identification purposes.

Although this example includes six video streams, the technology disclosed is designed to work with any number of video streams, typically more than available decompression resources are able to keep current. In some instances it may be practical to use as many as 50 or even 100 video streams. In other cases it may only be possible to handle as few as 2 or 3 video streams and possibly only one if the decompression resources, such as a general purpose CPU, are shared with unrelated workloads. This range takes into account the available resources and the loads imposed. First, the decompression resources may comprise as little as one personal computer or as much as a high performance commercial server with specialized hardware. Second, the load imposed by incoming video streams may change radically during the course of normal use depending on how many video stream sources are streaming images, the complexity of the images and the rate at which the images are changing. Third, the decompression resources may include a general purpose computer such as that in a laptop or desktop, which are running other processes unrelated to video processing that may be using widely varying amounts of that computer's processing capacity.

In environments addressed by the technology disclosed, there is a limit to the total available decompression resources. For example, video streams of increasing complexity, such as those having an increased bit rate or resolution, as well as the addition of video streams will increase the decompression load. Consequently, with an increased load, fewer decompression resources will be available for each stream. At some point the decompression resources can become overloaded and one or more of the video streams will not have enough of the decompression resources to decompress all of the incoming frames. If frames are processed on an FIFO basis, the decompressed frames will fall behind relative to their corresponding presentation times. In some cases the resulting images, such as those on a display, may appear pixelated, may be displayed at irregular intervals and may occasionally appear frozen. The above problems may be prevented or at least mitigated in part by detecting the condition in which the decompression resources are becoming overloaded and mitigating this condition by dropping frames.

Pseudo-Simultaneous Processing

Figure 3:
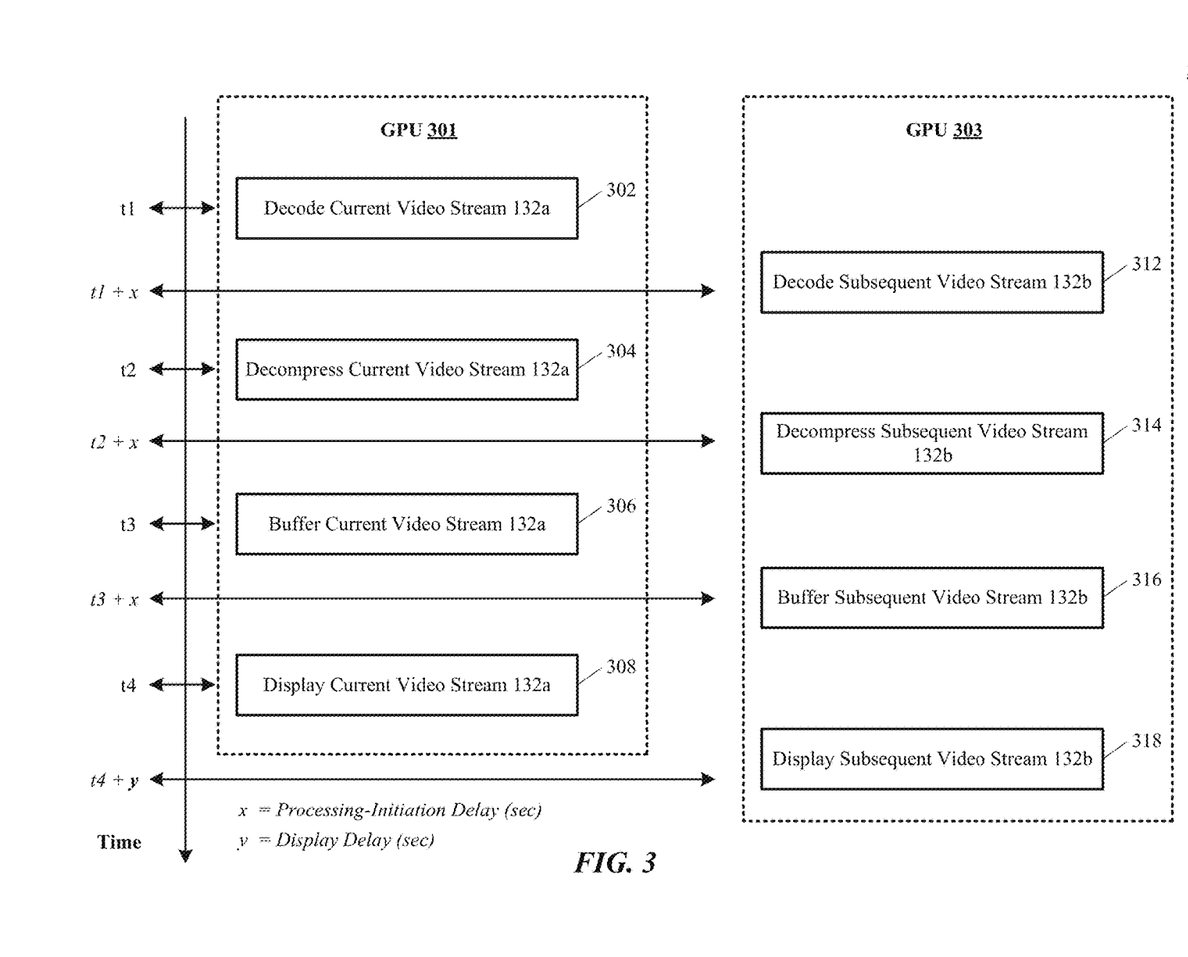
FIG. 3 shows one implementation of pseudo-simultaneous processing of current and subsequent video streams in a time-shifted mode to cause smooth transitioning between compressed video streams.
Figure 4:
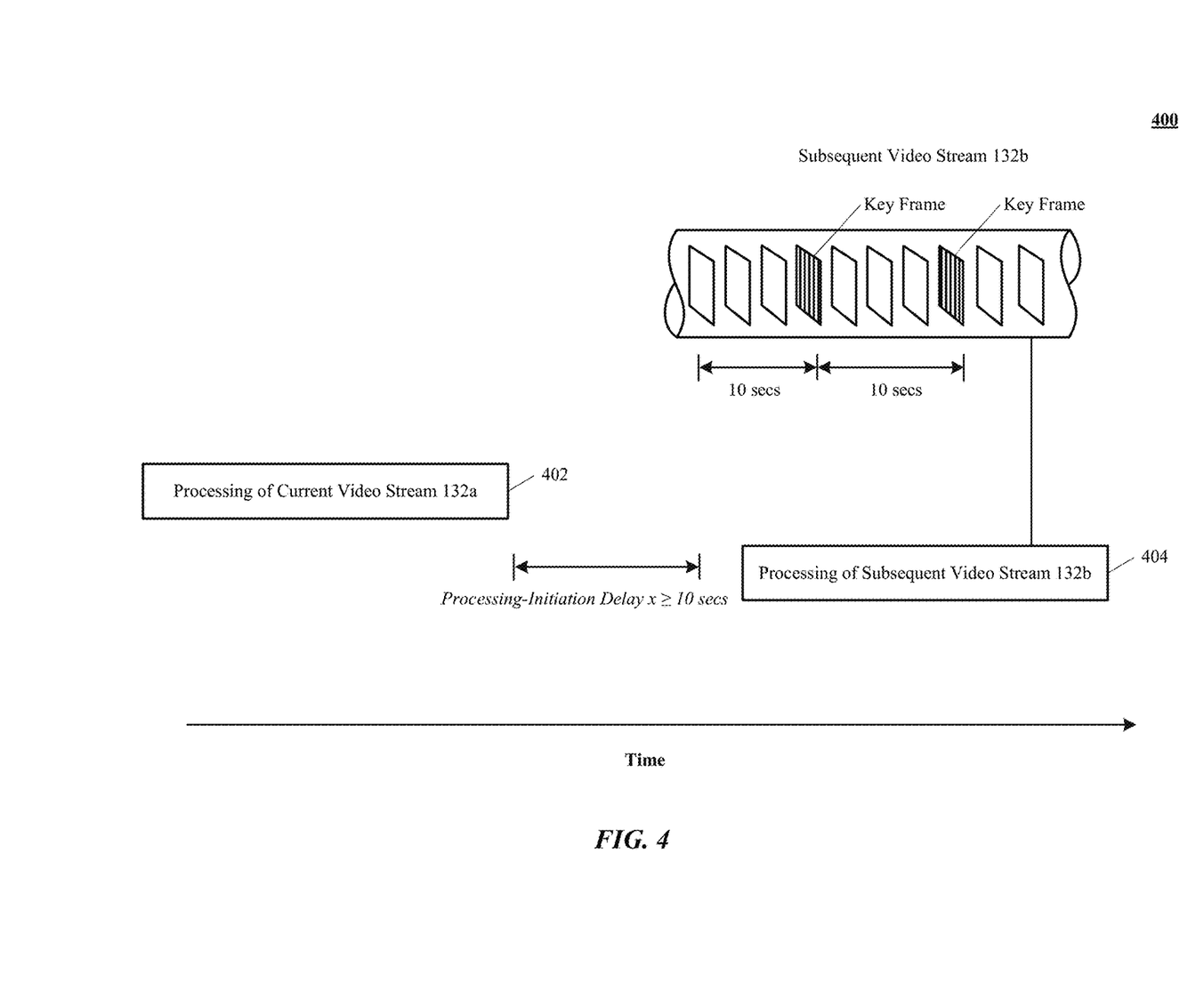
FIG. 4 illustrates one implementation of evaluating time separation between key frames and scheduling a switch based on the evaluated time separation.
Figure 5:
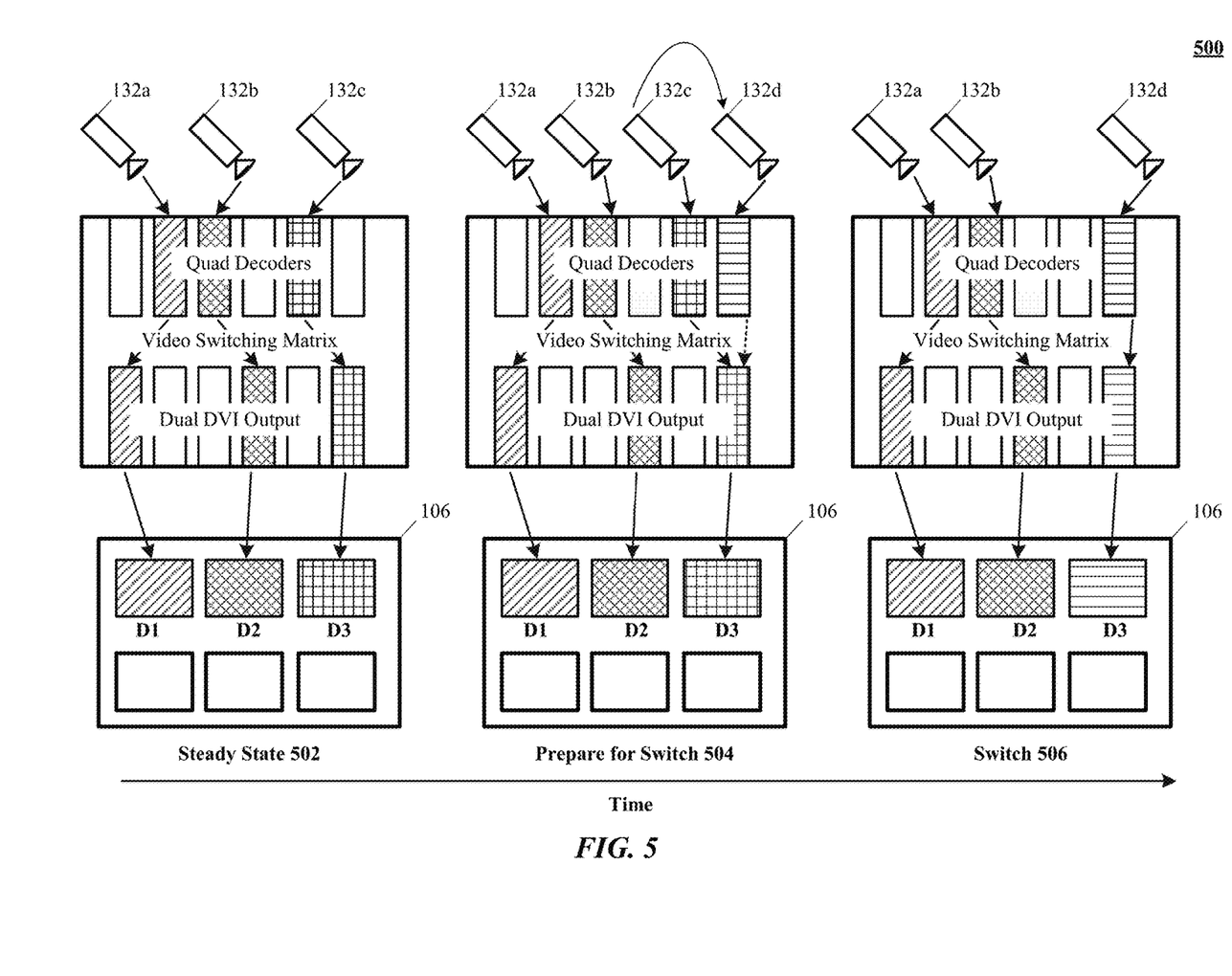
FIG. 5 is one implementation of modifying a z-order of different compressed video streams in a multicast streaming environment to enable instantaneous switch between the compressed video streams.

FIGS. 3-5 highlight that the disclosed pseudo-simultaneous processing of video streams using dedicated processing resources is distinct from existing solutions that reduce switching delays.

FIG. 3 shows one implementation of pseudo-simultaneous processing 300 of current and subsequent video streams in a time-shifted mode to cause smooth transitioning between compressed video streams. In particular, FIG. 3 illustrates video stream processing of two different video streams, current video stream 132a and subsequent video stream 132b, by two graphics processing units 301 and 303, respectively. In other implementations, video streams 132a and 132b can be processed by a same GPU.

In other implementations, processing 300 may not have the same actions, elements or components as those listed above and/or may have other/different actions, elements or components instead of, or in addition to, those listed above. The different actions, elements or components can be combined into single software modules and multiple software modules can run on the same hardware.

At time t1 and action 302, the current video stream 132a is decoded by GPU 301.

At a later time t1+x and action 312, the subsequent video stream 132b is decoded by GPU 303. The "x" refers to a processing-initiation delay relative to the initiation or completion of decoding of current video stream 132a. Processing-initiation delay represents the delay in triggering processing of the subsequent video stream relative to triggering of the processing of the current stream. Although, the subsequent video stream at some point is pseudo-simultaneously processed with the current video stream, according to an implementation. Here, x could be any temporal value that can be measured using any suitable unit, such as seconds, micro seconds, and so on. In other implementations, decoding of subsequent video stream 132b begins a time-shift after beginning or completion of decompression, buffering or display of current video stream 132a.

At time t2 and action 304, the current video stream 132a is decompressed by GPU 301.

At a later time t2+x and action 314, the subsequent video stream 132b is decompressed by GPU 303. The "x" refers to a processing-initiation delay relative to the initiation or completion of decompression of current video stream 132a. In other implementations, decompression of subsequent video stream 132b begins a time-shift after beginning or completion of decoding, buffering or display of current video stream 132a.

At time t3 and action 306, the current video stream 132a is buffered by GPU 301.

At a later time t3+x and action 316, the subsequent video stream 132b is buffered by GPU 303. The "x" refers to a processing-initiation delay relative to the initiation or completion of buffering of current video stream 132a. In other implementations, buffering of subsequent video stream 132b begins a time-shift after beginning or completion of decoding, decompression or display of current video stream 132a.

At time t3 and action 306, the current video stream 132a is buffered by GPU 301.

At a later time t3+x and action 316, the subsequent video stream 132b is buffered by GPU 303. The "x" refers to a processing-initiation delay relative to the initiation or completion of buffering of current video stream 132a. In other implementations, buffering of subsequent video stream 132b begins a time-shift after beginning or completion of decoding, decompression or display of current video stream 132a.

At time t4 and action 308, the current video stream 132a is displayed by GPU 301 across a particular interface.

At a later time t4+y and action 318, the subsequent video stream 132b is displayed by GPU 303 across the same particular interface in response to a switch command. The "y" refers to a display delay relative to the display of current video stream 132a across the particular interface. In one implementation, the difference between processing-initiation delay x and display delay y is that the processing-initiation delay x is dependent on the time separation between key frames of the subsequent video stream 132b, as described in the following discussion of FIG. 4.

In one implementation, the technology disclosed allows smooth compressed video stream transitioning in a multicast streaming environment without diminishing the video quality by executing the switch when a key frame of a video stream is detected. In such an implementation, no loss of video quality occurs on the client side because the client does not need the correct base sample to display the sample. However, waiting for a key frame causes a switch delay, making the switching not instantaneous. For example, the maximum delay for video frames having one key frame every eight frames would be about one third of a second. The technology disclosed solves this problem by pre-loading or pre-buffering the video stream in advance of the switch using additional processing resources so that the key frame of a subsequent video stream is available at the time of the switch and no switching delay occurs due to the awaiting key frame.

FIG. 4 illustrates one implementation of evaluating 400 time separation between key frames and scheduling a switch based on the evaluated time separation. In particular, transitioner 112 performs a switch between a current video stream 132a and a subsequent video stream 132b when a key frame of the subsequent video stream is encountered. As shown in FIG. 4, the subsequent video stream 132b comprises two key frames and a plurality of inter frames. The data from the key frames are pre-buffered in one of the stream-specific buffers 122a-n described above. Stream-specific buffers 122a-n each store the key frame data from the key frames along with the inter frame data from the inter frames.

In other implementations, evaluating 400 may not have the same actions, elements or components as those listed above and/or may have other/different actions, elements or components instead of, or in addition to, those listed above. The different actions, elements or components can be combined into single software modules and multiple software modules can run on the same hardware.

FIG. 4 illustrates that the time separation between key frames in the subsequent video stream 132b is ten seconds. As a result, the processing-initiation delay x between processing of current video stream 132a at action 402 and processing of subsequent video stream 132b at action 404 should be at least ten seconds or more so as to allow detection of at least one key frame of the subsequent video stream 132b. Such a timed pre-loading or pre-buffering approach allows for smooth transition between the current video stream 132a and the subsequent video stream 132a at any time rather than only when a key frame of the subsequent video stream is encountered.

FIG. 5 is one implementation of modifying 500 a z-order of different compressed video streams in a multicast streaming environment to enable instantaneous switch between the compressed video streams. In particular, FIG. 5 shows three states 502, 504 and 506 of multicast streaming environment 100. At steady state 502, video streams from three different video stream sources 132a, 132b and 132c are decoded by the quad decoders and arranged as three different window layers distinguished by visual hashing. The window layers are then transmitted to one or more dual DVI output ports by video switching matrix, which forwards them to display wall 106. Display wall 106 displays three video streams 132a, 132b and 132c across interfaces D1, D2 and D3, respectively.

In other implementations, modifying 500 may not have the same states, ordering, actions, elements or components as those listed above and/or may have other/different states, ordering, actions, elements or components instead of, or in addition to, those listed above. The different states, ordering, actions, elements or components can be combined into single software modules and multiple software modules can run on the same hardware.

Ordering of the window layers on the DVI output ports determines which video streams are displayed on which interfaces of the display wall 106. This ordering, called "z-ordering", can be modified to change the arrangement of the window layers on the DVI output ports and in turn cause a smooth transition between video streams 132a, 132b, 132c and 132d, as needed. Such a smooth transition is initiated in switch preparation state 504 in which a fourth video stream 132d is added to the multicast streaming environment 100. The fourth video stream 132d is pseudo-simultaneously processed while other video streams 132a, 132b and 132c are displayed across the display wall 106. Pseudo-simultaneous background processing of fourth video stream 132d generates a window layer for the fourth video stream 132d that is placed behind the currently displaying window layer of a video stream to be replaced, i.e., third video stream 132c in FIG. 5, which feeds into interface D3. During the switch preparation state 504, the newly placed window layer of fourth video stream 132d is not yet displayed across interface D3 because the z-ordering of window layers at the dual DVI output ports remains unchanged.

At switch state 506, z-ordering of window layers at the dual DVI output ports is modified such that the window layer of third video stream 132c is replaced by the window layer of fourth video stream 132d. As a result, fourth video stream 132d is instantaneously displayed across interface D3 because its window layer is generated sufficiently before the multicast streaming environment 100 enters the switch state 506. Following this, the previously displayed window layer of third video stream 132c is deleted.

Flowchart

Figure 6:
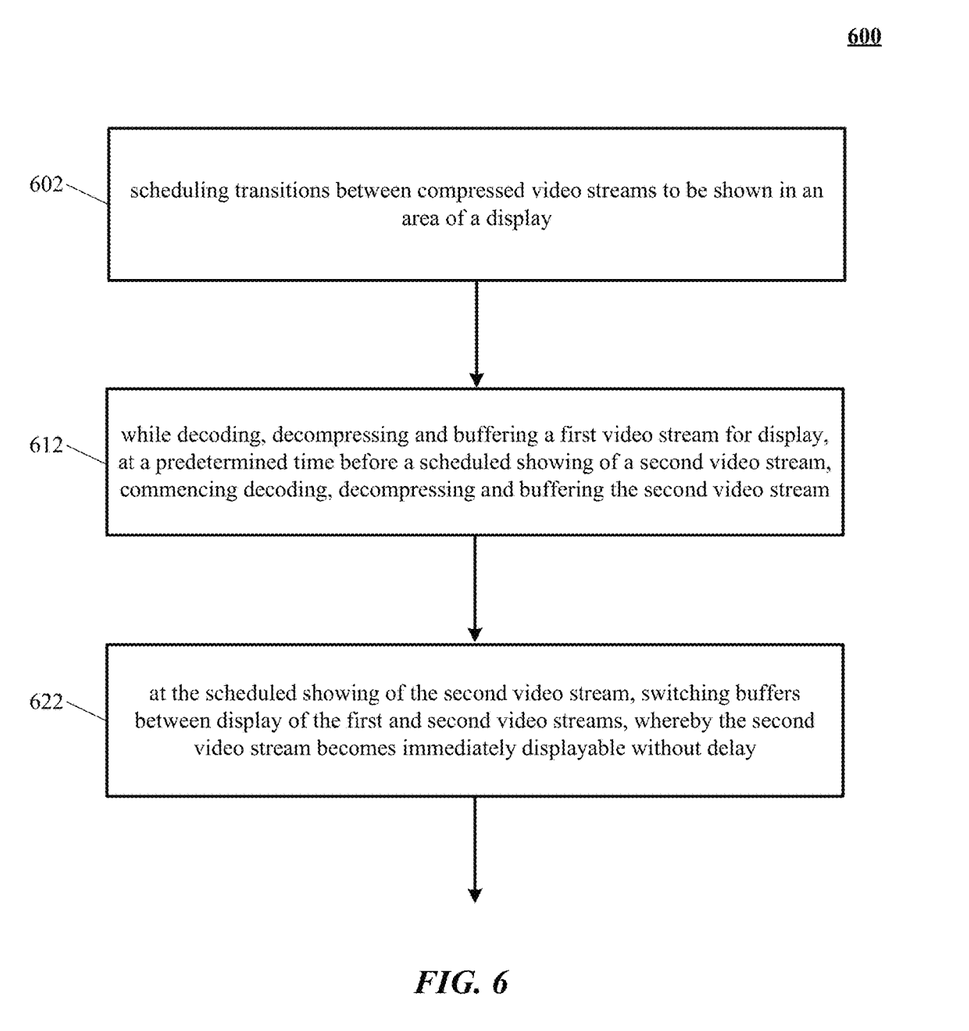
FIG. 6 is a representative method of smoothly transitioning between compressed video streams.

FIG. 6 is a representative method 600 of smoothly transitioning between compressed video streams. Flowchart 600 can be implemented at least partially with a computer or other data processing system, e.g., by one or more processors configured to receive or retrieve information, process the information, store results, and transmit the results. Other implementations may perform the actions in different orders and/or with different, fewer or additional actions than those illustrated in FIG. 6. Multiple actions can be combined in some implementations. For convenience, this flowchart is described with reference to the system that carries out a method. The system is not necessarily part of the method.

The method described in this section and other sections of the technology disclosed can include one or more of the following features and/or features described in connection with additional methods disclosed. In the interest of conciseness, the combinations of features disclosed in this application are not individually enumerated and are not repeated with each base set of features. The reader will understand how features identified in this method can readily be combined with sets of base features identified as implementations such as multicast streaming environment, multicast streaming workflow, pseudo-simultaneous processing, or computer system.

At action 602, transitions between compressed video streams are scheduled to be shown in an area of a display. In one implementation, the transitions are scheduled by an administrator using a user computing device, as discussed above.

At action 612, while decoding, decompressing and buffering a first video stream for display, decoding, decompressing and buffering of a second video stream is commenced at a predetermined time before a scheduled showing of the second video stream. This is achieved using an additional set of decoding logic and working storage to affect an instantaneous switch from the first video stream to the second video stream. It includes applying processing time delays to pseudo-simultaneously or simultaneously use a plurality of decoding logic and working storage units to process first and second video streams directed at the same display, such that decoding of a second video stream is initiated before the switch is scheduled to happen.

At action 622, buffers between display of the first and second video streams are switched at the scheduled showing of the second video stream to cause an immediate display of the second video stream without delay. In one implementation, switching between the buffers for the first and second video streams further includes modifying z-ordering of display layers corresponding to the first and second video streams, whereby a graphics card composes a display making visible the second video stream instead of the first video stream.

In another implementation, switching between the buffers for the first and second video streams further includes layer 2 switching of delivery of the first and second video streams to deliver the second video stream for display instead of the first video stream. In yet another implementation, switching between the buffers for the first and second video streams further includes updating a video switching matrix to couple the second video stream instead of the first video stream to the display.

Method 600 also includes evaluating time separation between key frames in the second video stream and selecting the predetermined time based at least in part on the time separation.

In case of multiple pairs of first and second video streams, method 600 further includes sequencing scheduled transitions between the first and second video streams to reduce a number of video streams that are simultaneously in transition between the first and second video stream decoding.

Other implementations of the method described in this section can include a non-transitory computer readable storage medium storing instructions executable by a processor to perform any of the methods described above. Yet another implementation of the method described in this section can include a system including memory and one or more processors operable to execute instructions, stored in the memory, to perform any of the methods described above.

Computer System

Figure 7:
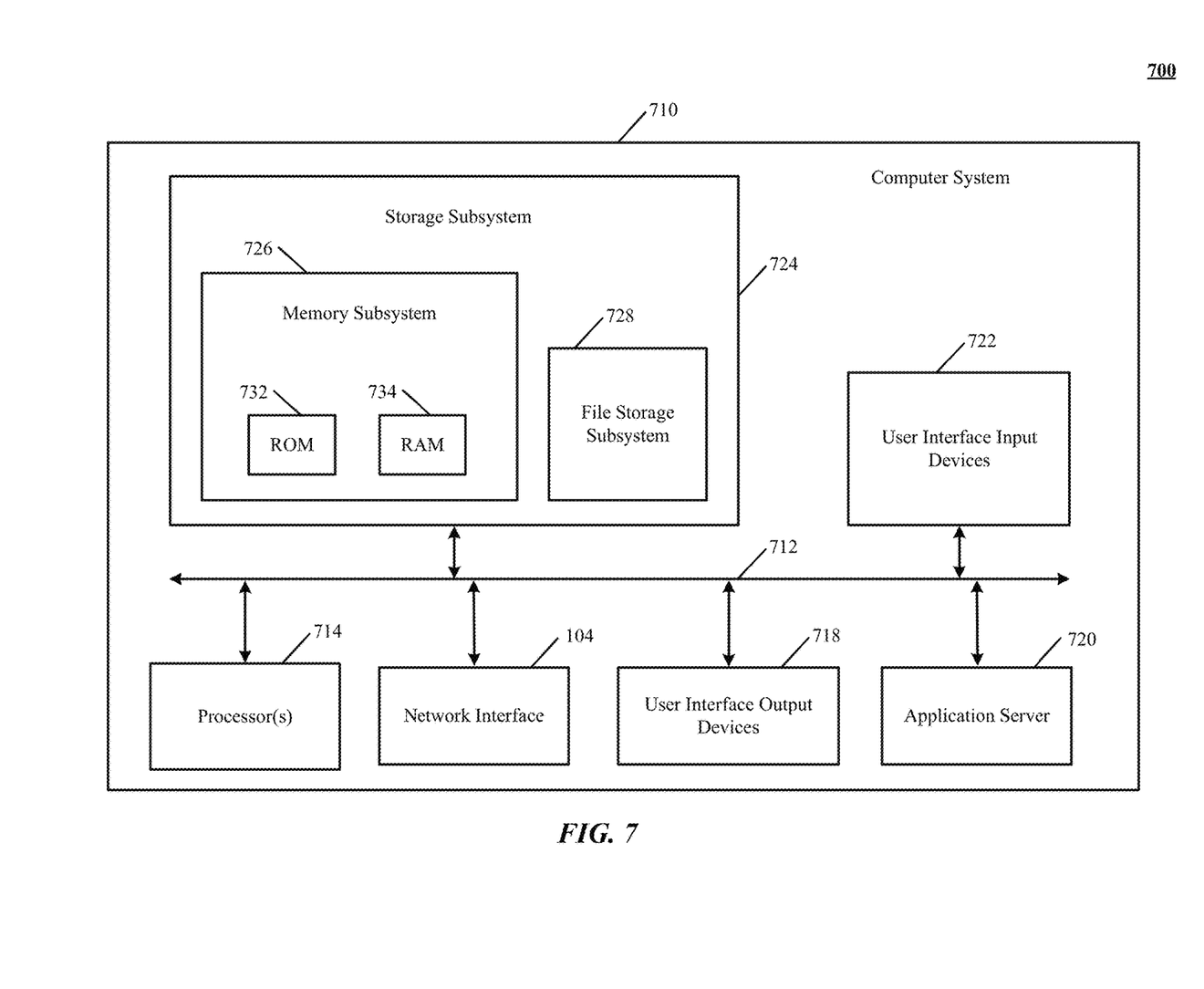
FIG. 7 is a block diagram of an example computer system to smoothly transition between compressed video streams.

FIG. 7 is a block diagram of an example computer system 700 to smoothly transition between compressed video streams. Computer system 700 typically includes at least one processor 714 that communicates with a number of peripheral devices via bus subsystem 712. These peripheral devices can include a storage subsystem 724 including, for example, memory devices and a file storage subsystem, user interface input devices 722, user interface output devices 718 and a network interface subsystem 104. The input and output devices allow user interaction with computer system 700. Network interface subsystem 104 provides an interface to outside networks, including an interface to corresponding interface devices in other computer systems. Application server 720 can be a framework that allows the applications of computer system 700 to run, such as the hardware and/or software, e.g., the operating system.

User interface input devices 722 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 700.

User interface output devices 718 can include a display subsystem, a printer, a fax machine, or non-visual displays such as audio output devices. The display subsystem can include a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 700 to the user or to another machine or computer system.

Storage subsystem 724 stores programming and data constructs that provide the functionality of some or all of the modules and methods described herein. These software modules are generally executed by processor 714 alone or in combination with other processors.

Memory 726 used in the storage subsystem can include a number of memories including a main random access memory (RAM) 734 for storage of instructions and data during program execution and a read only memory (ROM) 732 in which fixed instructions are stored. A file storage subsystem 728 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 728 in the storage subsystem 724, or in other machines accessible by the processor.

Bus subsystem 712 provides a mechanism for letting the various components and subsystems of computer system 700 communicate with each other as intended. Although bus subsystem 712 is shown schematically as a single bus, alternative implementations of the bus subsystem can use multiple busses.

Computer system 700 can be of varying types including a workstation, server, computing cluster, blade server, server farm, or any other data processing system or computing device. Due to the ever-changing nature of computers and networks, the description of computer system 700 depicted in FIG. 7 is intended only as one example. Many other configurations of computer system 700 are possible having more or fewer components than the computer system depicted in FIG. 7.

The terms and expressions employed herein are used as terms and expressions of description and not of limitation, and there is no intention, in the use of such terms and expressions, of excluding any equivalents of the features shown and described or portions thereof. In addition, having described certain implementations of the technology disclosed, it will be apparent to those of ordinary skill in the art that other implementations incorporating the concepts disclosed herein can be used without departing from the spirit and scope of the technology disclosed. Accordingly, the described implementations are to be considered in all respects as only illustrative and not restrictive.

What is claimed is:

1. A method of smoothly transitioning between pluralities of compressed video streams, in a multicast streaming environment, the method including:
  scheduling transitions between compressed video streams to be shown in a same area of a display;
  while decoding, decompressing and buffering a first video stream for display, at a predetermined time before a scheduled showing of a second video stream, commencing decoding, decompressing and buffering the second video stream; and
  at the scheduled showing of the second video stream, switching buffers between display of the first and second video streams in the same area, whereby the second video stream becomes immediately displayable without delay in the same area instead of the first video stream, where the first and second video streams are different video streams from different video stream sources in the multicast streaming environment.

2. The method of claim 1, further including evaluating time separation between key frames in the second video stream and selecting the predetermined time based at least in part on the time separation.

3. The method of claim 1, applied to multiple pairs of first and second video streams, further including sequencing scheduled transitions between the first and second video streams to reduce a number of video streams that are simultaneously in transition between the first and second video stream decoding.

4. The method of claim 1, wherein the switching between the buffers for the first and second video streams further includes modifying z-ordering of display layers corresponding to the first and second video streams, whereby a graphics card composes a display making visible the second video stream instead of the first video stream.

5. The method of claim 1, wherein the switching between the buffers for the first and second video streams further includes layer 2 switching of delivery of the first and second video streams to deliver the second video stream for display instead of the first video stream.

6. The method of claim 1, wherein the switching between the buffers for the first and second video streams further includes updating a video switching matrix to couple the second video stream instead of the first video stream to the display.

7. A system of smoothly transitioning between pluralities of compressed video streams, in a multicast streaming environment, the system including:
one or more processors coupled to memory, the memory loaded with computer instructions that, when executed on the processors, implement actions including:
scheduling transitions between pluralities of compressed video streams from different sources to be shown in a same area of a display of the multicast streaming environment;
while decoding, decompressing and buffering a first video stream for display, at a predetermined time before a scheduled showing of a second video stream, commencing decoding, decompressing and buffering the second video stream; and
at the scheduled showing of the second video stream, switching buffers between display of the first and second video streams in the same area, whereby the second video stream becomes immediately displayable in the same area instead of the first video stream without delay and where the buffers are stream-specific buffers.

8. The system of claim 7, further configured to evaluate time separation between key frames in the second video stream and to select the predetermined time based at least in part on the time separation.

9. The system of claim 7, applied to multiple pairs of first and second video streams, further configured to sequence scheduled transitions between the first and second video streams to reduce a number of video streams that are simultaneously in transition between the first and second video stream decoding.

10. The system of claim 7, wherein the switching between the buffers for the first and second video streams further includes modifying z-ordering of display layers corresponding to the first and second video streams, whereby a graphics card composes a display making visible the second video stream instead of the first video stream.

11. The system of claim 7, wherein the switching between the buffers for the first and second video streams further includes layer 2 switching of delivery of the first and second video streams to deliver the second video stream for display instead of the first video stream.

12. The system of claim 7, wherein the switching between the buffers for the first and second video streams further includes updating a video switching matrix to couple the second video stream instead of the first video stream to the display.

13. A non-transitory computer readable medium storing a plurality of instructions for programming one or more processors to smoothly transition between pluralities of compressed video streams, the instructions, when executed on the processors, implementing actions including:
scheduling transitions between pluralities of compressed video streams to be shown in a single area of a plurality of areas of a display in a multicast streaming environment;
while decoding, decompressing and buffering a first video stream from a first source for display, at a predetermined time before a scheduled showing of a second video stream from a second source, commencing decoding, decompressing and buffering the second video stream; and
at the scheduled showing of the second video stream, switching stream-specific buffers between display of the first and second video streams in the single area, whereby the second video stream becomes immediately displayable in the single area instead of the first video stream without delay.

14. The non-transitory computer readable medium of claim 13, further configured to evaluate time separation between key frames in the second video stream and to select the predetermined time based at least in part on the time separation.

15. The non-transitory computer readable medium of claim 13, applied to multiple pairs of first and second video streams, further configured to sequence scheduled transitions between the first and second video streams to reduce a number of video streams that are simultaneously in transition between the first and second video stream decoding.

16. The non-transitory computer readable medium of claim 13, wherein the switching between the buffers for the first and second video streams further includes modifying z-ordering of display layers corresponding to the first and second video streams, whereby a graphics card composes a display making visible the second video stream instead of the first video stream.

17. The non-transitory computer readable medium of claim 13, wherein the switching between the buffers for the first and second video streams further includes layer 2 switching of delivery of the first and second video streams to deliver the second video stream for display instead of the first video stream.

18. The non-transitory computer readable medium of claim 13, wherein the switching between the buffers for the first and second video streams further includes updating a video switching matrix to couple the second video stream instead of the first video stream to the display.

* * * * *